United States Patent
Luo et al.

(10) Patent No.: US 9,510,241 B2
(45) Date of Patent: Nov. 29, 2016

(54) CARRIER SELECTION METHOD AND APPARATUS

(71) Applicant: HUAWEI TECHNOLOGIES CO., LTD., Shenzhen, Guangdong (CN)

(72) Inventors: Haiyan Luo, Shanghai (CN); Tianle Deng, Shanghai (CN); Binsong Tang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 146 days.

(21) Appl. No.: 14/538,044

(22) Filed: Nov. 11, 2014

(65) Prior Publication Data

US 2015/0063307 A1    Mar. 5, 2015

Related U.S. Application Data

(63) Continuation of application No. PCT/CN2012/075390, filed on May 11, 2012.

(51) Int. Cl.
| | | |
|---|---|---|
| H04W 28/08 | (2009.01) | |
| H04W 36/16 | (2009.01) | |
| H04W 72/04 | (2009.01) | |

(52) U.S. Cl.
CPC ......... *H04W 28/085* (2013.01); *H04W 36/165* (2013.01); *H04W 72/0406* (2013.01); *H04W 72/0486* (2013.01)

(58) Field of Classification Search
None
See application file for complete search history.

(56) References Cited

U.S. PATENT DOCUMENTS

| | | | |
|---|---|---|---|
| 8,711,812 B2* | 4/2014 | Quan | H04L 5/003 370/230 |
| 2003/0224730 A1 | 12/2003 | Muszynski et al. | |
| 2006/0193338 A1 | 8/2006 | Zheng et al. | |
| 2009/0186627 A1* | 7/2009 | Zhang | H04W 72/0486 455/453 |
| 2011/0141933 A1 | 6/2011 | Kim et al. | |
| 2013/0012249 A1* | 1/2013 | Centonza | H04W 72/0426 455/501 |
| 2013/0022016 A1* | 1/2013 | Wei | H04L 5/0007 370/329 |
| 2013/0250882 A1* | 9/2013 | Dinan | H04W 72/0426 370/329 |

(Continued)

FOREIGN PATENT DOCUMENTS

| | | |
|---|---|---|
| CN | 101129038 A | 2/2008 |
| CN | 101742563 A | 6/2010 |

(Continued)

OTHER PUBLICATIONS

PCT International Search Report dated Feb. 28, 2013 in corresponding International Patent Application No. PCT/CN2012/075390.

(Continued)

*Primary Examiner* — Gary Mui
(74) *Attorney, Agent, or Firm* — Staas & Halsey LLP

(57) ABSTRACT

A carrier selection method and a base station are provided and are applied to the field of communications technologies. The carrier selection method includes: obtaining load status information corresponding to a control channel of a first base station on each carrier, where the load status information is used for indicating a load amount of the control channel; selecting, according to the load status information, from multiple carriers corresponding to the first base station, a carrier corresponding to a control channel with a relatively small load amount as an operational carrier for a second base station or a primary cell carrier for a user equipment served by the second base station. Carrier selection is implemented.

16 Claims, 1 Drawing Sheet

(56) References Cited

U.S. PATENT DOCUMENTS

2014/0120924 A1*  5/2014  Hahn .................. H04W 16/10
                                                      455/447
2014/0241293 A1   8/2014  Luo et al.

FOREIGN PATENT DOCUMENTS

| CN | 101754280 A | 6/2010 |
| CN | 102118753 | 7/2011 |
| CN | 102131276 | 7/2011 |
| CN | 102264141 A | 11/2011 |
| CN | 103096333 | 5/2013 |
| EP | 2197231 A2 | 6/2010 |

OTHER PUBLICATIONS

"3rd Generation Partnership Project; Technical Specification Group Radio Access Network; Evolved Universal Terrestrial Radio Access Network (E-UTRAN); X2 application protocol (X2AP) (Release 11)", 3GPP TS 36.423, V11.0.0, Mar. 2012, pp. 1-134.
"Carrier Based ICIC for inter-eNB PCell/SCell Optimization", Nokia Siemens Networks, 3GPP TSG-RAN WG3 Meeting #75-Bis, San Jose del Cabo, Mexico, Mar. 26-30, 2012, 4 pp.
International Search Report mailed Feb. 28, 2013, in corresponding International Patent Application No. PCT/CN2012/075390.
Extended European Search Report dated Mar. 4, 2015 in corresponding European Patent Application No. 12876574.0.
Chinese Office Action mailed Aug. 12, 2016 in corresponding Chinese Application No. 201280000999.9.
Nokia Siemens Networks, Nokia, "Primary Component Carrier Selection, Monitoring, and Recovery", 3GPP TSG RAN WG1 #57 Meeting, May 4-8, 2009, R1-091779, 6 pp.
Huawei, "Solution for Carrier selection of Carrier Based HetNet ICIC", 3GPP TSG-RAN WG3 Meeting #73, Aug. 22-26, 2011, R3-111857, 2 pp.

* cited by examiner

content truncated …

CARRIER SELECTION METHOD AND APPARATUS

CROSS REFRENCE

This application is a continuation of International Application No. PCT/CN2012/075390, filed e on May 11, 2012, which is hereby incorporated by reference in its entirety.

TECHNICAL FIELD

The present invention relates to the field of communications technologies, and in particular, to a carrier selection method and apparatus.

BACKGROUND

In a wireless communications system, a base station sends control information to a user equipment on a control channel, for example, in a long term evolution (Long Term Evolution, LTE) wireless communications system, a base station sends control information to a user equipment on a physical downlink control channel (Physical Downlink Control Channel, PDCCH), where the control information may include location information of a paging message, a wireless resource scheduled by the base station for the user equipment, and system information, and so on. In this way, the user equipment can send or receive data at a corresponding position of a data channel according to the obtained control information. If the user equipment fails to receive the information on the control channel, the user equipment cannot correctly obtain data on the data channel nor send the data on a specified wireless resource.

In a carrier aggregation (Carrier Aggregation, CA) scenario, multiple base stations such as a macro (Macro) base station and a pico cell (Pico) base station may share an operational carrier, each base station may have multiple operational carriers (operational carrier), and each base station can select carriers from the operational carriers as a primary cell (Primary Cell, PCell) and a secondary cell (Secondary Cell, SCell) for a user equipment served by the base station, where the primary cell mainly provides coverage for the user equipment, and the secondary cell is mainly used for increasing capacity. In this case, when a base station of a cell sends control information through a control channel, a control channel of another cell is interfered, thereby causing that performance of a control channel is poor.

SUMMARY

Embodiments of the present invention provide a carrier selection method and apparatus, so as to improve performance of a control channel of a cell.

In one aspect, an embodiment of the present invention provides a carrier selection method, where the method includes:
  obtaining load status information of a control channel of one or more first base stations on each carrier, where the load status information is used for determining a load amount of the control channel of each carrier; and
  selecting, according to the load status information, an operational carrier for a second base station or a primary cell carrier for a user equipment served by the second base station.

In another aspect, an embodiment of the present invention provides a carrier selection apparatus, where the apparatus includes:
  a load obtaining unit, configured to obtain load status information corresponding to a control channel of one or more first base stations on each carrier, where the load status information is used for determining a load amount of the control channel of each carrier; and
  a carrier selecting unit, configured to select, according to the load status information, an operational carrier for a second base station or a primary cell carrier for a user equipment served by the second base station.

By applying the method and apparatus provided in the embodiments of the present invention, an operational carrier for a second base station and a primary cell carrier for a user equipment can be selected more reasonably according to load status information that is used for determining a load amount of a control channel of a first base station, and interference from a control channel of another base station can be reduced when the user equipment served by the second base station receives control information, thereby improving performance of a control channel of a cell.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art according to the embodiments of the present invention without creative efforts shall fall within the protection scope of the present invention.

Figure 1:
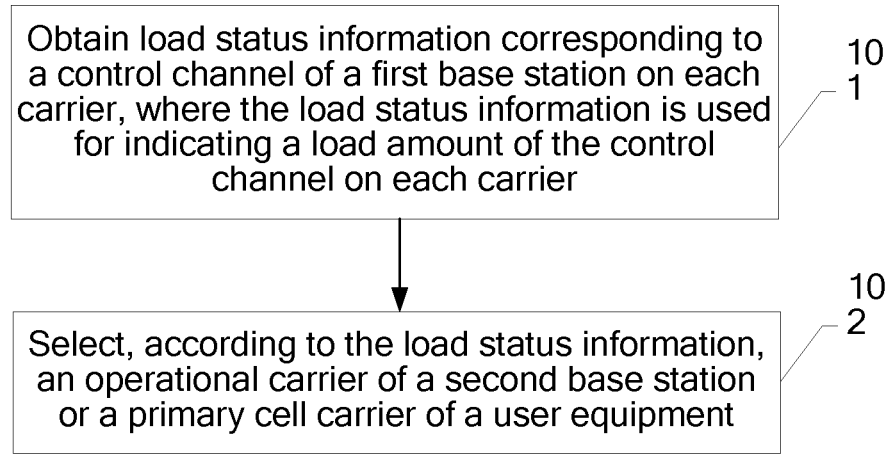
FIG. 1 is a flowchart of a carrier selection method according to an embodiment of the present invention.

As shown in FIG. 1, an embodiment of the present invention provides a carrier selection method, which can be used in a scenario where multiple base stations are synchronized and may share an operational carrier during carrier aggregation. The method includes:

Step 101: A second base station obtains load status information corresponding to a control channel of one or more first base stations on each carrier. The load status information may be used for determining a load amount of the control channel on each carrier.

For example, the second base station may directly receive load status information sent by a first base station, and each carrier corresponds to one piece of load status information.

The second base station may also obtain, through another communication node, load status information of a control channel of the first base station one each carrier, for example, the first base station may first send the load status information corresponding to the control channel on each carrier to a device on a core network side or to a network management system, and then the second base station obtains required load status information from the device on the core network side or the network management system. A person skilled in the art may understand that the another communication node includes but is not limited to the device on the core network side or the network management system.

The control channel in the embodiment of the present invention includes one of or a combination of the following: a physical downlink control channel PDCCH, a physical control format indictor channel (Physical Control Format Indictor Channel, PCFICH), and a physical hybrid indicator channel (Physical Hybrid indicator channel, PHICH).

In the embodiment of the present invention, the load status information may be determined by one of or a combination of the following: a resource element (Resource Element, RE) occupation rate of the control channel, the number of occupied control channel elements (Control Channel Element, CCE) of the control channel, an orthogonal frequency division multiplexing (Orthogonal Frequency Division Multiplexing, OFDM) symbol occupied by the control channel, and transmit power of the first base station on the control channel. The load amount of the control channel may be measured through one or more pieces of load status information that are determined by one of or a combination of the foregoing.

Generally, the greater the RE occupation rate of the control channel is, the greater the interference with a control channel of a neighboring cell is; the greater the number of occupied CCEs of the control channel is, the greater a load of the control channel is, and accordingly the greater the interference with the control channel of the neighboring cell is; the greater transmit power of a base station on the control channel is, the greater the interference with the control channel of the neighboring cell is; and the greater the number of occupied OFDM symbols is, the sparser the CCEs are and the smaller the interference with the control channel of the neighboring cell is in a case of the same number of occupied CCEs and the same transmit power. For example, in each sub-frame, a control channel of a base station on an operational carrier includes a PDCCH sent to multiple user equipments, and the PDCCH sent to each user equipment is formed by 1/2/4/8 CCEs, where one CCE includes 9 resource element groups (Resource Element Group, REG), where each REG is formed by 4 REs. 1/2/4/8 indicates CCE aggregation levels, where the higher an aggregation level is, the greater the number of occupied CCEs is. Therefore, the number of CCEs occupied by a PDCCH sent to a user equipment can reflect a load amount of a control channel. As an example, the load status information may also include: signal strength information of the control channel of the first base station on each carrier. The signal strength information may be determined by CCE information (for example, the number of the CCEs occupied by the control channel) of the first base station and transmit power information (for example, the transmit power or a quantized value of the transmit power) of the first base station on the control channel. Specifically, the CCE information of the first base station includes the number of CCEs occupied by a PDCCH sent by the first base station to each served user equipment. The transmit power information of the first base station on the control channel includes transmit power used by the first base station to send the PDCCH to each served user equipment.

As an example, the load status information may also include: physical resource occupation information of the first base station on the control channel. The physical resource occupation information of the first base station on the control channel includes an RE occupation rate of the first base station on the control channel. The RE occupation rate may be determined by the number of REs occupied by the control channel of the first base station on each carrier and the number of REs occupied by the number of OFDM symbols occupied by the control channel of the first base station on each carrier.

Step 102: Select, according to the load status information obtained in step 101, an operational carrier for the second base station or a primary cell carrier for a user equipment served by the second base station.

In the embodiment of the present invention, the second base station may obtain load status information of control channels of multiple first base stations on each carrier. In this case, when the second base station selects, according to the load status information, the operational carrier for the second base station or the primary cell carrier for the user equipment served by the second base station, the second base may obtain the load amount of the control channel of each carrier according to the load status information of the control channels of the multiple base stations on each carrier.

In a carrier aggregation scenario, the second base station needs to consider interference of the control channel of the first base station with a control channel of the second base station, and when selecting an operational carrier, according to a preset condition, the second base station may select one or more carriers corresponding to the load amount of the control channel of each carrier as the operational carrier or select the primary cell carrier for the user equipment served by the second base station. In this way, it is ensured that when the user equipment served by the second base station receives control information, interference caused by sending control information by the first base station is relatively small. Further, the second base station may also select the operational carrier or the primary cell carrier according to another parameter such as path loss information or interference information in addition to the foregoing load status information.

It should be noted that, in addition to obtaining load status information of another base station such as the first base station, the foregoing second base station may further send load status information corresponding to a control channel of the second base station on each carrier to the another base station, so that the another base station conveniently selects an operational carrier or a primary cell carrier. A specific carrier selection process is similar to that in steps 101 to 102 and is not described herein again.

By applying the technical solution provided in the embodiment of the present invention, an operational carrier for a second base station and a primary cell carrier for a user equipment can be selected more reasonably according to load status information that is used for determining a load amount of a control channel of each carrier, and interference from a control channel of another base station can be reduced when the user equipment served by the second base station receives control information, thereby improving performance of a control channel of a cell.

Another embodiment of the present invention provides a carrier selection method. The embodiment of the present invention is a further description of steps 101 to 102 of the embodiment shown in FIG. 1.

In the method, load status information includes: signal strength information of a control channel of a first base station on each carrier. In this case, the load status information obtained by a second base station may be the signal strength information. The signal strength information may be determined by the first base station according to CCE information (for example, the number of CCEs occupied by the control channel) of the first base station and transmit power information (for example, transmit power or a quantized value of the transmit power) of the first base station on the control channel, and then obtained by the second base station.

A person skilled in the art may understand that the signal strength information may also be determined by the second base station according to the CCE information (for example, the number of the CCEs occupied by the control channel) of the first base station and the transmit power information (for example, the transmit power or the quantized value of the transmit power) of the first base station on the control channel. In this case, before the second base station obtains load status information corresponding to a control channel of one or more first base stations on each carrier, the method further includes: The second base station obtains the CCE information of the first base station and the transmit power information of the first base station on the control channel, and then the second base station determines the foregoing signal strength information according to the obtained CCE information of the first base station and the obtained transmit power information on the control channel of the first base station.

As an example, the first base station or the second base station determines the signal strength information according to the CCE information of the first base station and the transmit power information on the control channel of the first base station.

Example 1: For a specific carrier, it is assumed that the number of user equipments (UE) served by the first base station is N, i=1, 2, ..., N, and in a sub-frame n, the number of CCEs occupied by a PDCCH sent by an $i^{th}$ UE served by the first base station on the control channel and used transmit power are Ni and Pi, respectively. Then in a sub-frame, a product of the number of CCEs occupied by a PDCCH corresponding to all the user equipments and transmit power corresponding to the PDCCH may be expressed as:

$$E(n) = \sum_{i=1}^{N} N_i P_i.$$

By averaging E(n) in M sub-frames, the foregoing average is obtained, and the signal strength information:

$$\overline{E} = \frac{1}{M} \sum_{m=1}^{M} \sum_{i=1}^{N} N_i P_i$$

is further obtained. The smaller an average or a quantified value of the average is, the smaller a load amount corresponding to the control channel is. The foregoing M sub-frames may be an information exchange cycle, that is, a cycle for exchanging load status information between the first base station and the second base station.

Example 2: For a specific carrier, it is assumed that the number of user equipments (UE) served by the first base station is N, i=1, 2, ..., N, and in a sub-frame n, the number of CCEs occupied by a $UE_i$ on the control channel and transmit power are Ni and Pi, respectively. Then in M sub-frames, the average number of CCEs occupied by a PDCCH sent by the first base station to the user equipment i on the control channel is $$\overline{N}_i = \frac{1}{M} \sum_{m=1}^{M} N_i,$$

average transmit power of the PDCCH sent by the first base station to the user equipment i on the control channel is $$\overline{P}_i = \frac{1}{M} \sum_{m=1}^{M} P_i,$$

and accordingly a product is the signal strength information $$\overline{E} = \sum_{i=1}^{N} \overline{N}_i \overline{P}_i.$$

Alternatively, in M sub-frames, the average number of CCEs occupied by a PDCCH sent by the first base station to all served user equipments on the control channel is $$\overline{N} = \frac{1}{M} \sum_{m=1}^{M} \sum_{i=1}^{N} N_i,$$

average transmit power of the PDCCH sent by the first base station to all the served user equipments on the control channel is $$\overline{P} = \frac{1}{M} \sum_{m=1}^{M} \sum_{i=1}^{N} P_i,$$

and accordingly an obtained product is the signal strength information $\overline{E} = \overline{N}\overline{P}$.

Examples 1 and 2 are two examples that the signal strength information included in the load status information is determined according to the CCE information of the first station and the transmit power information on the control channel of the first base station in the carrier selection method provided in the embodiment of the present invention. A person skilled in the art may understand that the foregoing signal strength information is determined according to the CCE information of the first station and the transmit power information on the control channel of the first base station, which includes but is not limited to Examples 1 and 2.

In the embodiment of the present invention, in a case of multiple first base stations, the signal strength information obtained by the second base station may be determined according to CCE information of the multiple first base stations and transmit power information on control channels of the multiple first base stations. A person skilled in the art may understand that in the case of multiple first base stations, the signal strength information that needs to be obtained by the second base station may be determined by any one or more of the multiple first base stations, or may be determined by the second base station after the second base station obtains the CCE information of the multiple first base stations and the transmit power information on the control channels of the multiple base stations, or may be determined jointly by the second base station and the multiple first base stations.

For example, carriers available for selection are f1, f2, and f3. The multiple first base stations are eNB1, eNB2, eNB3, and eNB4, and the second base station is eNB0. The second base station eNB0 receives signal strength information of the base stations eNB1, eNB2, eNB3, and eNB4 on each carrier, as shown in Table 1.

TABLE 1

|    | eNB1 | eNB2 | eNB3 | eNB4 |
|----|------|------|------|------|
| f1 | E1, 1 |      | E3, 1 | E4, 1 |
| f2 | E1, 2 | E2, 2 | E3, 2 |      |
| f3 | E1, 3 | E2, 3 | E3, 3 | E4, 3 |

In Table 1, $E_{i,j}$ indicates signal strength information of the $eNB_i$ (where i may be 1, 2, 3, or 4) on a carrier j (where j may be 1, 2, or 3). It may be expressed that: a set of first base stations that work on a specific carrier $f_j$ is $S_j$. For example, in Table 1, the set $S_1$ includes the eNB1, eNB3, and eNB4. The set $S_2$ includes the eNB1, eNB2, and eNB3. The rest can be deduced by analog. In this case, a load amount of a control channel may be calculated in the following several manners, but the embodiment of the present invention is not limited thereto.

For example: (1) Averaging. For example, for the carrier $f_j$, the load amount of the control channel is:

$$L_j = \frac{\sum_{i \in S_j} E_{i,j}}{|S_j|}.$$

$|S_j|$ indicates the number of elements in the set $S_j$. For example, for the carrier $f_1$, the load amount of the control channel is $L_1=(E_{1,1}+E_{3,1} E_{4,1})/3$, and the rest can be deduced by analog.

(2) Weighted average.

It is expressed that $O_{i,j}$ indicates a PRB occupation rate of the base station i on the carrier $f_j$. The PRB occupation rate may be obtained through a *Radio Resource Status* IE exchanged between base stations. For details, reference is made to TS36.423. Then the load amount of the control channel of $f_j$ is:

$$L_j = \frac{\sum_{i \in S_j} O_{i,j} E_{i,j}}{|S_j|}.$$

First signal strength information corresponding to a control channel of each carrier may be exchanged between base stations, and accordingly when performing the foregoing step 102, the second base station obtains the load amount of the control channel of each carrier according to the foregoing method, and then selects, according to a preset condition, one or more carriers corresponding to a relatively small load amount of the control channel as an operational carrier or a primary cell carrier for a user equipment served by the second base station. The load amount of the control channel of each carrier may also be obtained with reference to first signal strength information and another parameter such as a path loss parameter, and the operational carrier or the primary cell carrier is selected according to the preset condition. In the embodiment of the present invention, the preset condition may include: (1) one or more carriers whose load amount is less than a certain threshold are selected as the operational carrier for the second base station, or one carrier is selected as the primary cell carrier for the user equipment; and (2) load amounts of various carriers are sorted in ascending order, and one or more carriers that can satisfy a service load amount required by the user equipment served by the second base station are selected. The preset conditions for selecting a carrier are similar in the embodiments provided in the present invention, and are not described in the following again.

As an example, it is assumed that path loss information of the second base station and path loss information of the first base station may be obtained by obtaining geographical location information through a global positioning system (Global Positioning System, GPS). For example, a distance $D_{ij}$ between the two may be calculated. It is assumed that that $PL_{ij}$ indicates path loss between the two base stations, and then a path loss calculation manner is $PL_{i,j}=D_{i,j}^{-\alpha}$, where α indicates a signal transmission loss coefficient. For example, in a free space, a transmission loss coefficient of a signal transmitted along a path is α=2. In this case, for example, for the eNB0, the load amount of the control channel of the carrier $f_j$ is calculated as:

$$L_j = \frac{\sum_{i \in S_j} PL_{0,j} E_{i,j}}{|S_j|}.$$

In a case that weight is considered, $$L_j = \frac{\sum_{i \in S_j} PL_{0,j} O_{i,j} E_{i,j}}{|S_j|}.$$

By applying the technical solution provided in the embodiment of the present invention, load status information of a control channel of one or more base stations on each carrier includes signal strength information of a control channel of a first base station on each carrier, and a load amount of the control channel of each carrier may be determined according to the signal strength information, so that an operational carrier for a second base station or a primary cell carrier for a user equipment served by the second base station is selected more appropriately, thereby reducing possible interference from a neighboring cell.

An embodiment of the present invention provides another carrier selection method, where the method is a specific example of steps 101 and 102 in the method shown in FIG. 1. In the method, load status information includes an RE occupation rate of a control channel of a first base station on each carrier.

It should be noted that when a base station sends a PDCCH to a user equipment on a control channel, particularly, the base station indicates, on a PCFICH, how many OFDM symbols actually occupied by the control channel, and generally, the number of the OFDM symbols is 1 to 3, so that the user equipment may learn a time domain start position of a data channel according to the PCFICH.

It can be understood that the RE occupation rate may be determined by the first base station or may be determined by a second base station. When the RE occupation rate is determined by the second base station, before obtaining the RE occupation rate, the second base station needs to obtain information required for determining the RE occupation rate.

As an example, the RE occupation rate of the control channel of the first base station on each carrier may be determined by the number of REs corresponding to the number of CCEs occupied by the control channel of the first base station and the number of REs corresponding to the number of OFDM symbols occupied by the first base station on the control channel. For example, it is assumed that in a sub-frame n, the number of REs corresponding to the number of CCEs occupied by a PDCCH sent by the first base station on the control channel to all user equipments served by the first base station is $N_{CCE}$, and the number of the REs corresponding to the number of the OFDM symbols occupied by the control channel of the first base station is $N_{OFDM}$. Then the RE occupation rate of the control channel may be considered as $$R(n) = \frac{N_{CCE}}{N_{OFDM}},$$

an average of RE occupation rates of the control channel in M sub-frames is $$\overline{R} = \frac{1}{M}\sum_{m=1}^{M} R(m),$$

and the average or a quantified value of the average is the foregoing RE occupation rate. The second base station may select, according to the RE occupation rate, an operational carrier for the second base station or a primary cell carrier for a user equipment served by the second base station.

Further, in addition to the foregoing RE occupation rate, the average number of OFDM symbols occupied by a user equipment on a control channel or a quantified value of the number of the OFDM symbols may also be exchanged between base stations. The second base station may determine, according to the RE occupation rate and information of an OFDM symbol, a carrier that needs to be selected.

As an example, the RE occupation rate may also be determined by the numbers of REs occupied by a physical downlink control channel, that is, a PDCCH, a physical control format indictor channel, that is, a PCFICH, and a physical hybrid indicator channel, that is, a PHICH, and the number of the REs corresponding to the number of OFDM symbols occupied by the first base station on the control channel.

For example, it is assumed that in a sub-frame n, the number of REs occupied by the PDCCH sent by the first base station on the control channel to all the user equipments served by the first base station is $N_{CCE}$, the number of the REs corresponding to the number of the OFDM symbols occupied by the control channel of the first base station is $N_{OFDM}$, and the numbers of REs corresponding to the PCFICH and the PHICH occupied by the first base station on the control channel are $N_{PCFICH}$ and $N_{PHICH}$, respectively. Then the RE occupation rate of the control channel may be considered as $$R(n) = \frac{N_{CCE} + N_{PCFICH} + N_{PHICH}}{N_{OFDM}},$$

an average of RE occupation rates of the control channel in M sub-frames is $$\overline{R} = \frac{1}{M}\sum_{m=1}^{M} R(m),$$

and the RE occupation rate obtained by the second base station is the average or a quantified value of the average.

Further, in addition to the foregoing RE occupation rate, the average number of OFDM symbols occupied by a user equipment on a control channel or a quantified value of the number of the OFDM symbols may also be exchanged between base stations. The second base station may determine, according to the RE occupation rate and information of an OFDM symbol, a load amount of a control channel of one or more base stations on each carrier, and then select an operational carrier or a primary cell carrier for a user equipment served by the second base station. As an example, in a case of multiple first base stations, the second base station determines the load amount of the control channel of each carrier according to RE occupation rate information of control channels of the multiple first base stations on each carrier. It is assumed that $\eta_{i,j}$ is an RE occupation rate of a control channel of the eNBi on the carrier j, and for the carrier fj, the load amount of the control channel is:

$$L_j = \frac{\sum_{i \in S_j} \eta_{i,j}}{|S_j|}.$$

The second base station may also determine the load amount of the control channel of each carrier according to an RE occupation rate of the control channels of the multiple first base stations on each carrier and information of OFDM symbols occupied by the control channel of the first base station on each carrier. It is assumed that Ni,j indicates the number of OFDM symbols occupied by the control channel of the eNBi on the carrier j, and for the carrier fj, the load amount of the control channel is:

$$L_j = \frac{\sum_{i \in S_j} N_{i,j}\eta_{i,j}}{|S_j|}.$$

After obtaining the RE occupation rate and the load amount, the second base station may select a carrier according to a preset condition. It is assumed that carriers are sorted in ascending order according to the load amount Lj of the control channel, where the preset condition includes but is not limited to the following: (1) Selection is performed according to a load amount threshold Th of the control channel. If the carrier fj satisfies Lj<Th, the second base station selects the carrier fj as an operational carrier. When a primary cell carrier is selected for a specific UE, any carrier satisfying a condition Lj<Th may be selected according to the condition. (2) Selection is performed according to a service load amount of the UE served by the second base station. For example, the service load amount of the UE served by the second base station is X, and the second base station estimates that a service load amount that the carrier fi can support is Xi. A simple selection method is that the second base station selects a first few carriers from the carriers that have been sorted according to the load amount to enable a sum of X is to be greater than or equal to X.

By applying the technical solution provided in the embodiment of the present invention, an operational carrier for a second base station and a primary cell carrier for a user equipment served by the second base station can be selected more appropriately according to load status information, thereby reducing possible interference from a neighboring cell.

A person skilled in the art may understand that the foregoing method embodiments can be mutually combined to generate other embodiments, which is not described herein again.

Figure 2:
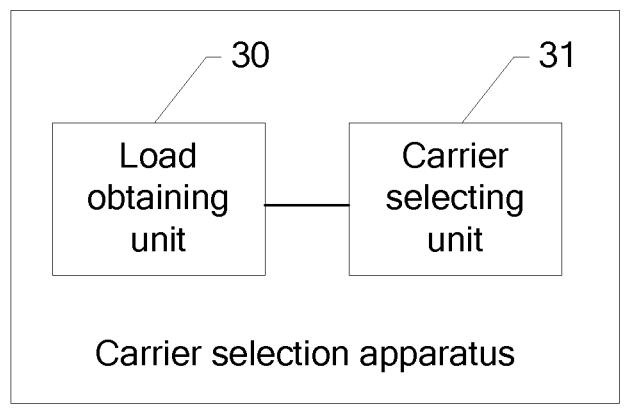
FIG. 2 is a schematic structural diagram of a carrier selection apparatus according to an embodiment of the present invention.

An embodiment of the present invention provides a carrier selection apparatus, and the apparatus may be the foregoing second base station. A schematic structure diagram is shown in FIG. 2, which includes:

a load obtaining unit 30, configured to obtain load status information corresponding to a control channel of one or more first base stations on each carrier, where the load status information is used for determining a load amount of the control channel of each carrier; and a carrier selecting unit 31, configured to select, according to the load status information, an operational carrier for a second base station or a primary cell carrier for a user equipment served by the second base station.

In the apparatus in this embodiment, the load obtaining unit 30 obtains the load status information corresponding to the control channel of the first base station on each carrier, and the carrier selecting unit 31 selects, from multiple carriers available for selection, one or more carriers that correspond to the control channel and meet a preset condition (where the preset condition is the same as that in the method embodiments, and is not described herein again) as the operational carrier for the second base station or the primary cell carrier for the user equipment served by the second base station. In this way, during carrier selection, the carrier selecting unit 31 selects a carrier with a relatively small load amount in consideration of the load amount corresponding to the control information on each carrier and in further consideration of interference caused by a control channel of another base station to a control channel of a receiving base station, so that the interference from the control channel of the another base station may be relatively small when a user equipment served by the receiving base station receives control information, thereby improving performance of a control channel of a cell.

Figure 3:
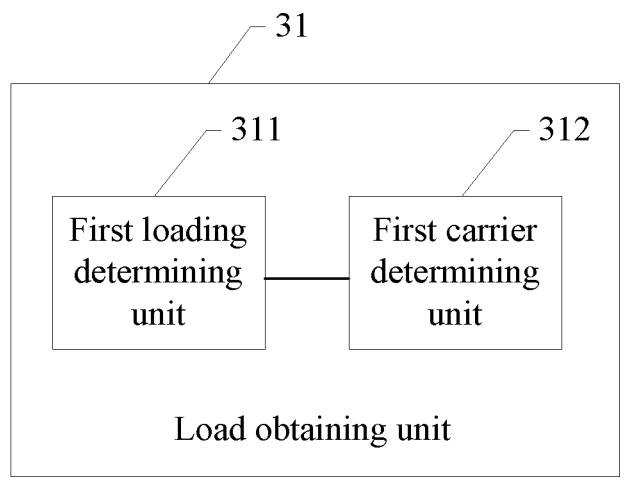
FIG. 3 is a schematic structural diagram of a load obtaining unit in a carrier selection apparatus according to an embodiment of the present invention.

Optionally, the foregoing load status information may include signal strength information of the control channel of the first base station on each carrier. The signal strength information may be determined by CCE information of the first base station and transmit power information of the first base station on the control channel. Further, as shown in FIG. 3, the foregoing carrier selecting unit 31 may include:

a first load amount determining unit 311, configured to determine the load amount of the control channel of each carrier according to the signal strength information of the control channel of the first base station on each carrier; and a first carrier determining unit 312, configured to select, according to a preset condition, one or more carriers corresponding to the load amount of the control channel of each carrier as the operational carrier for the second base station or the primary cell carrier for the user equipment served by the second base station. Optionally, being similar to FIG. 3, the foregoing load obtaining unit includes: a second load amount determining unit 313, configured to determine the load amount of the control channel of each carrier according to the signal strength information of the control channel of the first base station on each carrier and path loss information between the first base station and the second base station; and a second carrier determining unit 314, configured to select, according to a preset condition, one or more carriers corresponding to the load amount of the control channel of each carrier as the operational carrier for the second base station or the primary cell carrier for the user equipment served by the second base station.

Optionally, the foregoing load status information may include physical resource occupation information of the first base station on the control channel. The occupation information includes an RE occupation rate of the first base station on the control channel. The RE occupation rate may be determined by the number of REs occupied by the control channel of the first base station on each carrier and the number of REs occupied by the number of OFDM symbols occupied by the control channel of the first base station on each carrier. As an example, the foregoing carrier selecting unit 31, being similar to FIG. 3, may include: a third load amount determining unit 315, configured to determine the load amount of the control channel of each carrier according to the RE occupation rate of the first base station on the control channel; and a third carrier determining unit 316, configured to select, according to a preset condition, one or more carriers corresponding to the load amount of the control channel of each carrier as the operational carrier for the second base station or the primary cell carrier for the user equipment served by the second base station. As an example, the foregoing carrier selecting unit 31, being similar to FIG. 3, may include: a fourth load amount determining unit 317, configured to determine the load amount of the control channel of each carrier according to the RE occupation rate of the first base station on the control channel and information of an orthogonal frequency division multiplexing OFDM symbol occupied by the first base station on the control channel, where the information of the OFDM symbol includes the number of the OFDM symbols occupied by the first base station on the control channel of each carrier; and a fourth load amount determining unit 318, configured to select, according to a preset condition, one or more carriers corresponding to the load amount of the control channel of each carrier as the operational carrier for the second base station or the primary cell carrier for the user equipment served by the second base station.

The apparatus provided in the embodiment of the present invention can perform the steps in the foregoing method embodiments. All descriptions in the method embodiments are applicable to the apparatus provided in this embodiment.

As an example, the apparatus provided in the example can perform the steps in the foregoing method embodiments.

For example, in the method embodiments, the load status information may include the signal strength information, where the signal strength information is determined by the CCE information of the first base station and the transmit power information of the first base station on the control channel. The apparatus provided in the embodiment of the present invention may further include a signal strength information determining unit, configured to determine the signal strength information according to the CCE information of the first base station and the transmit power information of the first base station on the control channel. Correspondingly, the apparatus provided in this embodiment may further include: a CCE information obtaining unit, configured to obtain the CCE information of the first base station; and a transmit power information obtaining unit, configured to obtain the transmit power information of the first base station on the control channel.

For another example, in the method embodiments, the load status information may include the physical resource occupation information of the first base station on the control channel. The occupation information includes the resource element RE occupation rate of the first base station on the control channel. The RE occupation rate is determined by the number of REs occupied by the control channel on each carrier and the number of REs occupied by the number of OFDM symbols occupied by the control channel. Correspondingly, the apparatus provided in this embodiment may further include an RE occupation rate determining unit, configured to determine the RE occupation rate according to the number of REs occupied by the control channel on each carrier and the number of REs occupied by the number of OFDM symbols occupied by the control channel. Correspondingly, the apparatus provided in this embodiment may further include: an obtaining unit for obtaining the number of RE occupied by a control channel, configured to obtain the number of REs occupied by the control channel on each carrier; and an obtaining unit for obtaining the number of REs occupied by the number of OFDM symbols, configured to obtain the number of REs occupied by the number of OFDM symbols occupied by the control channel.

A person skilled in the art may understand that the embodiment of the present invention may further include some units corresponding to the method embodiments, so as to perform the steps in the method embodiments or perform functions generated by the method steps, which is not described herein again.

By applying the apparatus provided in the embodiment of the present invention, an operational carrier and a primary cell carrier for a user equipment can be selected more reasonably according to load status information that is used for determining a load amount of a control channel of each carrier, and interference from a control channel of another base station can be reduced when the user equipment receives control information, thereby improving performance of a control channel of a cell.

Another embodiment of the present invention further provides a computer program product, where the computer program product includes a storage medium, and the storage medium stores a code of the carrier selection method in the embodiment of the present invention. By applying the computer program product, an operational carrier for a second base station and a primary cell carrier for a user equipment can be selected more reasonably according to load status information that is used for determining a load amount of a control channel of each carrier, and interference from a control channel of another base station can be reduced when the user equipment served by the second base station receives control information, thereby improving performance of a control channel of a cell.

A person of ordinary skill in the art may understand that all or a part of the steps of the methods in the foregoing embodiments may be implemented by a computer program instructing relevant hardware. The program may be stored in a computer readable storage medium. The storage medium may include a ROM, a RAM, a magnetic disk, an optical disc, or the like.

The carrier selection method and the base station provided in the embodiments of the present invention are described in detail in the foregoing. Although the principle and implementation manners of the present invention are described with reference to specific examples in this specification, descriptions of the foregoing embodiments are only intended to help understand the method and core ideas of the present invention. Meanwhile, variations may be made by a person of ordinary skill in the art according to the ideas of the present invention to the specific implementation manners and application scope. Therefore, the content of the specification shall not be construed as a limitation to the present invention.

What is claimed is:

1. A carrier selection method, comprising:
obtaining, by a second base station, load status information of a control channel of one or more first base stations on each carrier, wherein the load status information comprises signal strength information of the control channel of the first base station on each carrier, the signal strength information is determined by control channel element (CCE) information of the first base station and transmit power information of the first base station on the control channel, and the load status information is used for determining a load amount of the control channel of each carrier; and
selecting, by the second base station, according to the load status information, an operational carrier for the second base station or a primary cell carrier for a user equipment served by the second base station.

2. The method according to claim 1, wherein the selecting, according to the load status information, an operational carrier for a second base station or a primary cell carrier for a user equipment served by the second base station comprises:
determining, by the second base station, the load amount of the control channel of each carrier according to the signal strength information of the control channel of the first base station on each carrier; and
selecting, by the second base station, according to a preset condition, one or more carriers corresponding to the load amount of the control channel of each carrier as the operational carrier for the second base station or the primary cell carrier for the user equipment served by the second base station.

3. The method according to claim 1, wherein the selecting, according to the load status information, an operational carrier for a second base station or a primary cell carrier for a user equipment served by the second base station comprises:
determining, by the second base station, the load amount of the control channel of each carrier according to the signal strength information of the control channel of the first base station on each carrier and path loss information between the first base station and the second base station; and
selecting, by the second base station, according to a preset condition, one or more carriers corresponding to the load amount of the control channel of each carrier as the operational carrier for the second base station or the primary cell carrier for the user equipment served by the second base station.

4. The method according to claim 1, wherein the load status information comprises physical resource occupation information of the first base station on the control channel.

5. The method according to claim 4, wherein the physical resource occupation information of the first base station on the control channel comprises a resource element (RE) occupation rate of the first base station on the control channel.

6. The method according to claim 5, wherein the RE occupation rate of the first base station on the control channel is determined by the number of REs occupied by the control channel of the first base station on each carrier and the number of REs occupied by the number of orthogonal frequency division multiplexing (OFDM) symbols occupied by the first base station on the control channel of each carrier.

7. The method according to claim 5, wherein the selecting, by the second base station, according to the load status information, an operational carrier for the second base station or a primary cell carrier for a user equipment served by the second base station comprises:
determining, by the second base station, the load amount of the control channel of each carrier according to the RE occupation rate of the first base station on the control channel; and
selecting, by the second base station, according to a preset condition, one or more carriers corresponding to the load amount of the control channel of each carrier as the operational carrier for the second base station or the primary cell carrier for the user equipment served by the second base station.

8. The method according to claim 5, wherein the selecting, by the second base station, according to the load status information, an operational carrier for the second base station or a primary cell carrier for a user equipment served by the second base station comprises:
determining, by the second base station, the load amount of the control channel of each carrier according to the RE occupation rate of the first base station on the control channel and information of an orthogonal frequency division multiplexing OFDM symbol occupied by the first base station on the control channel, wherein the information of the OFDM symbol comprises the number of OFDM symbols occupied by a user equipment served by the first base station on the control channel of each carrier; and
selecting, by the base station, according to a preset condition, one or more carriers corresponding to the load amount of the control channel of each carrier as the operational carrier for the second base station or the primary cell carrier for the user equipment served by the second base station.

9. The method according to claim 1, wherein the control channel comprises one of or a combination of the following: a physical downlink control channel (PDCCH), a physical control format indictor channel (PCFICH), and a physical hybrid indicator channel (PHICH).

10. A carrier selection apparatus, wherein the apparatus is a second base station comprising a processor and a memory coupled to the processor;
wherein the processor is configured to:
obtain load status information corresponding to a control channel of one or more first base stations on each carrier, wherein the load status information comprises signal strength information of the control channel of the first base station on each carrier, the signal strength information is determined by control channel element (CCE) information of the first base station and transmit power information of the first base station on the control channel, and the load status information is used for determining a load amount of the control channel of each carrier; and
select, according to the load status information, an operational carrier for the second base station or a primary cell carrier for a user equipment served by the second base station.

11. The apparatus according to claim 10, wherein the processor is configured to select, according to the load status information, an operational carrier for the second base station or a primary cell carrier for a user equipment served by the second base station, comprising:
the processor is configured to determine the load amount of the control channel of each carrier according to the signal strength information of the control channel of the first base station on each carrier and to select, according to a preset condition, one or more carriers corresponding to the load amount of the control channel of each carrier as the operational carrier for the second base station or the primary cell carrier for the user equipment served by the second base station.

12. The apparatus according to claim 10, wherein the load status information comprises physical resource occupation information of the first base station on the control channel.

13. The apparatus according to claim 12, wherein the physical resource occupation information of the first base station on the control channel comprises a resource element (RE) occupation rate of the first base station on the control channel.

14. The apparatus according to claim 13, wherein the RE occupation rate of the first base station on the control channel is determined by the number of REs occupied by the control channel of the first base station on each carrier and the number of REs occupied by the number of orthogonal frequency division multiplexing (OFDM) symbols occupied by the first base station on the control channel of each carrier.

15. The apparatus according to claim 13, wherein the processor is configured to select, according to the load status information, an operational carrier for the second base station or a primary cell carrier for a user equipment served by the second base station, comprising:
the processor is configured to determine the load amount of the control channel of each carrier according to the RE occupation rate of the first base station on the control channel and to select, according to a preset condition, one or more carriers corresponding to the load amount of the control channel of each carrier as the operational carrier for the second base station or the primary cell carrier for the user equipment served by the second base station.

16. The apparatus according to claim 13, wherein the processor is configured to select, according to the load status information, an operational carrier for the second base station or a primary cell carrier for a user equipment served by the second base station, comprising:
the processor is configured to determine the load amount of the control channel of each carrier according to the RE occupation rate of the first base station on the control channel and information of an orthogonal frequency division multiplexing (OFDM) symbol occupied by the first base station on the control channel, wherein the information of the OFDM symbol comprises the number of OFDM symbols occupied by a user equipment served by the first base station on the control channel of each carrier; and to select, according to a preset condition, one or more carriers corresponding to the load amount of the control channel of each carrier as the operational carrier for the second base station or the primary cell carrier for the user equipment served by the second base station.

* * * * *